United States Patent
Zhang et al.

(10) Patent No.: US 8,224,538 B2
(45) Date of Patent: Jul. 17, 2012

(54) APPARATUS AND METHOD FOR USING TRANSMISSION OUTPUT TORQUE DATA TO CONTROL GEAR CHANGE

(75) Inventors: Zhen Zhang, Canton, MI (US); Shushan Bai, Ann Arbor, MI (US); John R. Maten, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/616,686

(22) Filed: Nov. 11, 2009

(65) Prior Publication Data

US 2011/0111921 A1    May 12, 2011

(51) Int. Cl.
*G06F 7/00* (2006.01)

(52) U.S. Cl. ........... 701/52; 701/51; 701/53; 701/54; 701/55; 701/61; 701/84; 701/90; 701/95; 477/15; 477/17; 477/19; 477/34; 477/77; 477/99; 477/101; 477/107; 477/115; 180/53.4; 180/65.28; 180/269; 180/366; 180/337

(58) Field of Classification Search ............ 701/51, 701/56; 180/53.4, 65.28; 477/11–19
See application file for complete search history.

(56) References Cited

U.S. PATENT DOCUMENTS

| | | | | |
|---|---|---|---|---|
| 4,868,753 A * | 9/1989 | Mori | | 701/66 |
| 5,131,295 A * | 7/1992 | Kodama | | 477/155 |
| 7,261,672 B2 * | 8/2007 | Frank et al. | | 477/45 |
| 7,286,922 B1 * | 10/2007 | Fischer et al. | | 701/51 |
| 2004/0192506 A1 * | 9/2004 | Nakamura | | 477/176 |
| 2004/0254047 A1 * | 12/2004 | Frank et al. | | 477/37 |
| 2005/0137056 A1 * | 6/2005 | Yamada et al. | | 477/156 |
| 2007/0042864 A1 * | 2/2007 | Martin | | 477/166 |
| 2011/0111921 A1 * | 5/2011 | Zhang et al. | | 477/115 |

* cited by examiner

*Primary Examiner* — Redhwan K Mawari

(57) ABSTRACT

An automatic transmission includes gears, torque-transmitting mechanisms, interconnecting members, an input member and an output member. A method of controlling the automatic transmission includes data acquisition from the output shaft torque sensor, commanding a hydraulic fluid pressure pulse time and a pressure pulse value to engage a first torque-transmitting mechanism, calculating a rate-of-change of a first data output from the output shaft torque sensor, calculating a rate-of-change of a second data output from the output shaft torque sensor, comparing the results of the rate-of-change calculations and adjusting the hydraulic fluid pressure pulse time and a pressure pulse value if the rate of change of the second data output is not equal to the rate-of-change of the first data output.

11 Claims, 3 Drawing Sheets

APPARATUS AND METHOD FOR USING TRANSMISSION OUTPUT TORQUE DATA TO CONTROL GEAR CHANGE

FIELD

The present invention relates to an apparatus and method of controlling an automatic shifting power transmission using output torque data to improve control of the transmission.

BACKGROUND

The statements in this section merely provide background information related to the present invention and may or may not constitute prior art.

In automatic shifting power transmissions, gear ratio changes are effected by selectively interconnecting members of gear sets. This is accomplished by selectively engaging torque-transmitting devices such as brakes or clutches which rotationally couple together the members of the gear sets either directly or via rotating shafts or members. For each gear ratio change, there is a corresponding sequence of off-going torque-transmitting device disengagement and on-coming torque-transmitting device engagement.

A typical torque-transmitting device is a combination of a piston and a set of friction plates. One subset of the friction plates is rotatably supported by one rotating member and a second subset of the friction plates is rotatably supported by a second rotating member. To join the rotating members for common rotation, a controlled force is applied by the piston to the friction plates to create enough friction for both subsets of the friction plates to rotate in common which in turn joins the two members for common rotation.

Many torque-transmitting devices require hydraulic fluid pressure to move a piston into a position to contact the friction plates and to apply a force to the friction plates. The amount of force required to move the piston into position is less than the force required to compress the friction plates together. Therefore, there is a desire to provide and control variable pressure to the piston to improve the smooth yet quick engagement of the clutches using an efficient hydraulic fluid system.

Additionally, a majority of automatic shifting power transmissions use a transmission control module or controller that receives data and instruction from other sensors or controllers in the vehicle. The transmission controller utilizes the sensor data along with stored program logic to provide instructions to the hydraulic fluid system of the transmission for optimum operation. Vehicle sensors may include speed sensors, throttle position sensors, load sensors, etc. while program controller logic may include shift-timing schedules, etc. Therefore, there is a desire to utilize sensor data in a control method to provide commands to a transmission hydraulic fluid system for improved and optimal operation of clutches and brakes. Accordingly, there is room in the art for an apparatus and method for controlling the application of fluid pressure to torque-transmitting mechanisms to improve gear shift smoothness, timing and efficiency.

SUMMARY

In one example of the present invention an automatic transmission includes a transmission housing, an input member and an output member, a plurality of torque-transmitting mechanisms operable to provide a plurality of gear ratios between the input member and the output member, a torque sensor disposed in the transmission housing proximate the output member and a transmission control module having a control logic sequence. The control logic operates to control engagement of each of the torque-transmitting mechanisms. The torque sensor is capable of detecting a torque applied to the output member and sending a torque signal to the transmission control module.

The control logic includes a first control logic for generating a torque signal indicative of the torque applied to the output member, a second control logic for filtering the torque signal, a third control logic for generating and storing an initial torque signal data set from the filtered torque signal, a fourth control logic for receiving a gear change command, a fifth control logic for commanding a hydraulic fluid pressure pulse time and pressure pulse value to engage a first torque-transmitting mechanism, a sixth control logic for disengaging a second torque-transmitting mechanism, a seventh control logic for calculating an initial rate-of-change of the stored torque signal data set, a eighth control logic for storing the initial rate-of-change, a ninth control logic for generating and storing a second torque signal data set from the filtered torque signal, a tenth control logic for calculating a second rate-of-change of the second torque signal data set and an eleventh control logic for adjusting the hydraulic fluid pressure pulse time and pressure pulse value if the second rate-of-change is not equal to the initial rate-of-change.

In another example of the present invention, the automatic transmission further includes a hydraulic control system in communication with the transmission control module.

In yet another example of the present invention, the hydraulic control system receives a command signal from the transmission control module and generates a hydraulic signal.

In yet another example of the present invention, the hydraulic control system communicates the hydraulic signal to one of the plurality of torque transmitting mechanisms.

In yet another example of the present invention, the command signal includes the hydraulic fluid pressure pulse and pressure pulse value.

Another embodiment of the present invention is a method of controlling a torque-transmitting mechanism of an automatic transmission, the transmission includes a housing, a plurality of torque-transmitting mechanisms, a plurality of gears and a torque sensor. The torque sensor is located on the housing of the automatic transmission. The method includes generating a torque signal from the torque sensor indicative of the torque applied to the shaft, filtering the torque signal, generating and storing an initial torque signal data set from the filtered torque signal, receiving a gear change command, commanding a hydraulic fluid pressure pulse time and a pressure pulse value to engage a first torque-transmitting mechanism, disengaging a second torque-transmitting mechanism, calculating an initial rate-of-change of the stored torque signal data set, storing the initial rate-of-change, generating and storing a second torque signal data set from the filtered torque signal, calculating a second rate-of-change of the second torque signal data set and adjusting the hydraulic fluid pressure pulse time and a pressure pulse value if the second rate-of-change is not equal to the initial rate-of-change.

Further objects, examples and advantages of the present invention will become apparent by reference to the following description and appended drawings wherein like reference numbers refer to the same component, element or feature.

DRAWINGS

The drawings described herein are for illustration purposes only and are not intended to limit the scope of the present invention in any way;

DETAILED DESCRIPTION

Figure 1:
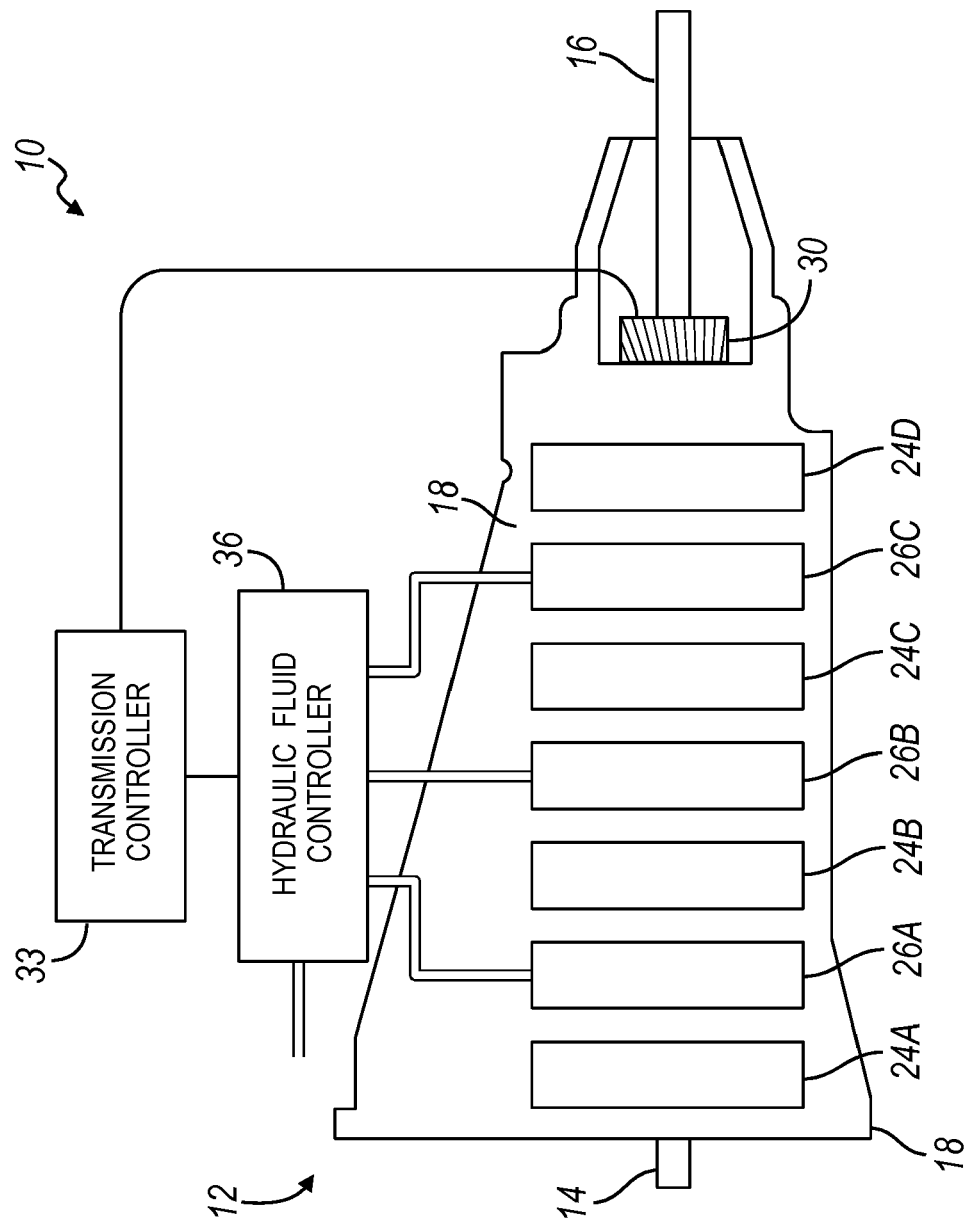
FIG. 1 is a schematic of an exemplary transmission including a transmission controller and a hydraulic control system according to the present invention.

With reference to FIG. 1, a schematic of an exemplary transmission according to the principles of the present invention is generally indicated by reference number 10. The transmission 10 includes a typically cast, metal housing 12 which encloses and protects the various components of the transmission 10. The housing 12 includes a variety of apertures, passageways, shoulders and flanges which position and support these components. The transmission 10 includes an input shaft or member 14, an output shaft or member 16, and an exemplary gear arrangement 18. The input shaft 14 is connected with a prime mover (not shown). The prime mover may be an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the gear arrangement 18.

The gear arrangement 18 may take various forms and configurations but generally includes a plurality of gears 24A-D and a plurality of torque transmitting mechanisms 26A-C. Each of the gears 24A-D are arranged along with the torque-transmitting mechanisms 26A-C and interconnecting members (not shown) in the transmission housing 12 to provide a variety of gear ratios between the input member 14 and the output member 16. Each of the torque-transmitting mechanisms 26A-C are selectively engageable to connect a one of the gears 26A-D with at least one of the gears 26A-D, the input or output members 20, 22 or the transmission housing 12. The torque-transmitting mechanisms 26A-C are engageable in combinations of two to engage a particular gear ratio. For example, to affect a gear ratio between the input and output members 20, 22, a first torque-transmitting mechanism 26A and a second torque-transmitting mechanism 26B are engaged while the third torque-transmitting mechanism 26C remains disengaged. Furthermore, to achieve a successive change in the gear ratio only one of the torque-transmitting mechanisms 26A-26C is disengaged while only one of the torque-transmitting mechanisms 26A-26C is engaged. For example, to effect a change from a second gear ratio to a third gear ratio wherein the second gear ratio requires the first and second torque-transmitting mechanisms 26A, 26B engaged, the first torque-transmitting mechanism 26A remains engaged, the second torque-transmitting mechanism 26B disengages and the third torque-transmitting mechanism 26C engages. While the transmission 10 is illustrated as having three planetary gear sets 24A-D and three torque-transmitting mechanisms 26A-C, it should be appreciated that the transmission 10 may have any number and type of gears or gear sets and any number and type of torque-transmitting mechanisms arranged in any configuration with any number of dual clutches, countershafts, propshafts, reverse or idler shafts, and sleeve and center shafts without departing from the scope of the present invention.

Figure 2:
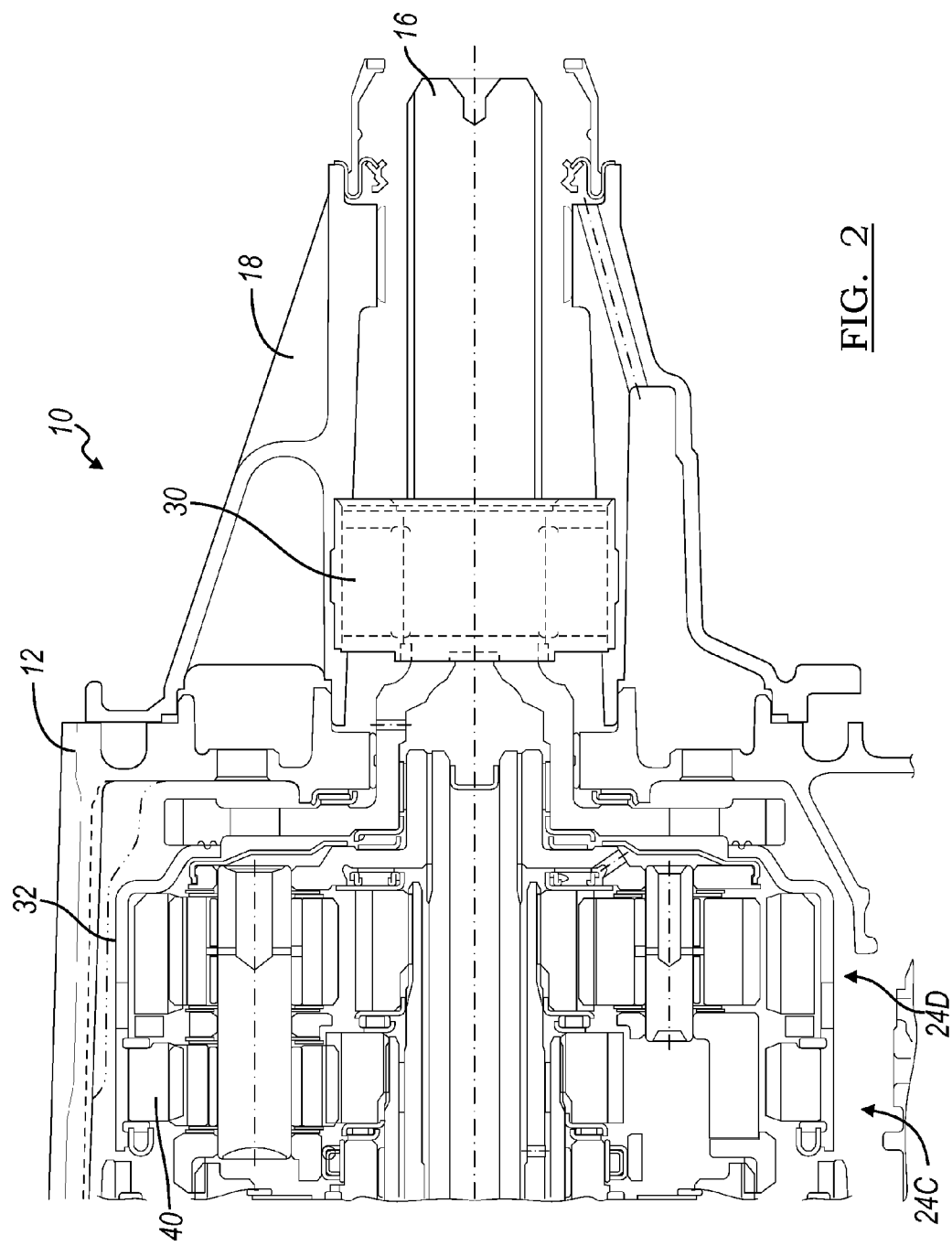
FIG. 2 is a cross-section view of an embodiment of a partial transmission highlighting an output shaft and a torque sensor according to the present invention.

Turning now to FIG. 2 and with continuing reference to FIG. 1, an exemplary cross-section of a portion of the transmission 10 is illustrated. The transmission 10 further includes a torque sensor 30 and an interconnecting member 32 and the gears 24C, 24D are planetary gear sets 24C, 24D. The planetary gear sets 24C, 24D each have a plurality of members including a first, a second and a third member. For example, the interconnecting member 32 connects the output member 16 to the third member 40 of the planetary gear set 24C. The torque sensor 30 is annular shaped and is mounted to the transmission housing 12 in such a manner to allow the output member 16 to pass through the center of the torque sensor 30. The torque sensor 30 is operable to detect or sense the torque applied through the output member 16. The torque sensor 30 may be of various types, such as, for example, strain gages, magnetic or optical sensors, and surface acoustic wave (SAW) sensors. These torque sensors each measure various parameters such as local strain, angular displacement, or strained-induced change on an acoustic wave in order to determine the torque applied on the output member 16. The torque sensor 30 is in electronic communication with a transmission controller 33 and is operable to send a signal to the transmission controller 33 which corresponds to the amount of torque applied to the output member 16.

The transmission controller 33 generally includes an electronic control device having a preprogrammed digital computer or processor, control logic, memory used to store data, and at least one I/O peripheral. The control logic includes a plurality of logic routines for monitoring, manipulating, and generating data. The control logic may be implemented in hardware, software, or a combination of hardware and software. For example, control logic may be in the form of program code that is stored on the electronic memory storage and executable by the processor. The transmission controller 33 receives the torque sensor 30 output signal, performs the control logic and sends command signals to a hydraulic control system 36. The hydraulic control system 36 receives command signals from the transmission controller 33 and converts the command signals to hydraulic signals to control the actuation of the torque-transmitting mechanisms 26A-C. These control signals include, for example, a pulse time and a pressure pulse value for each of the torque-transmitting mechanisms 26A-C.

For example, a control logic implemented in software program code that is executable by the processor of the transmission controller 33 includes a first control logic for generating a torque signal indicative of the torque applied to the output member 16, a second control logic for filtering the torque signal, a third control logic for generating and storing an initial torque signal data set from the filtered torque signal, a fourth control logic for receiving a gear change command, a fifth control logic for commanding a hydraulic fluid pressure pulse time and a pressure pulse value to engage a first of the torque-transmitting mechanisms 26A-C, a sixth control logic for disengaging a second of the torque-transmitting mechanisms 26A-C, a seventh control logic for calculating an initial rate-of-change of the stored torque signal data set, an eighth control logic for storing the initial rate-of-change, a ninth control logic for generating and storing a second torque signal data set from the filtered torque signal, a tenth control logic for calculating a second rate-of-change of the second torque signal data set and an eleventh control logic for adjusting the hydraulic fluid pressure pulse time and a pressure pulse value if the second rate-of-change is not equal to the initial rate-of-change.

Figure 3:
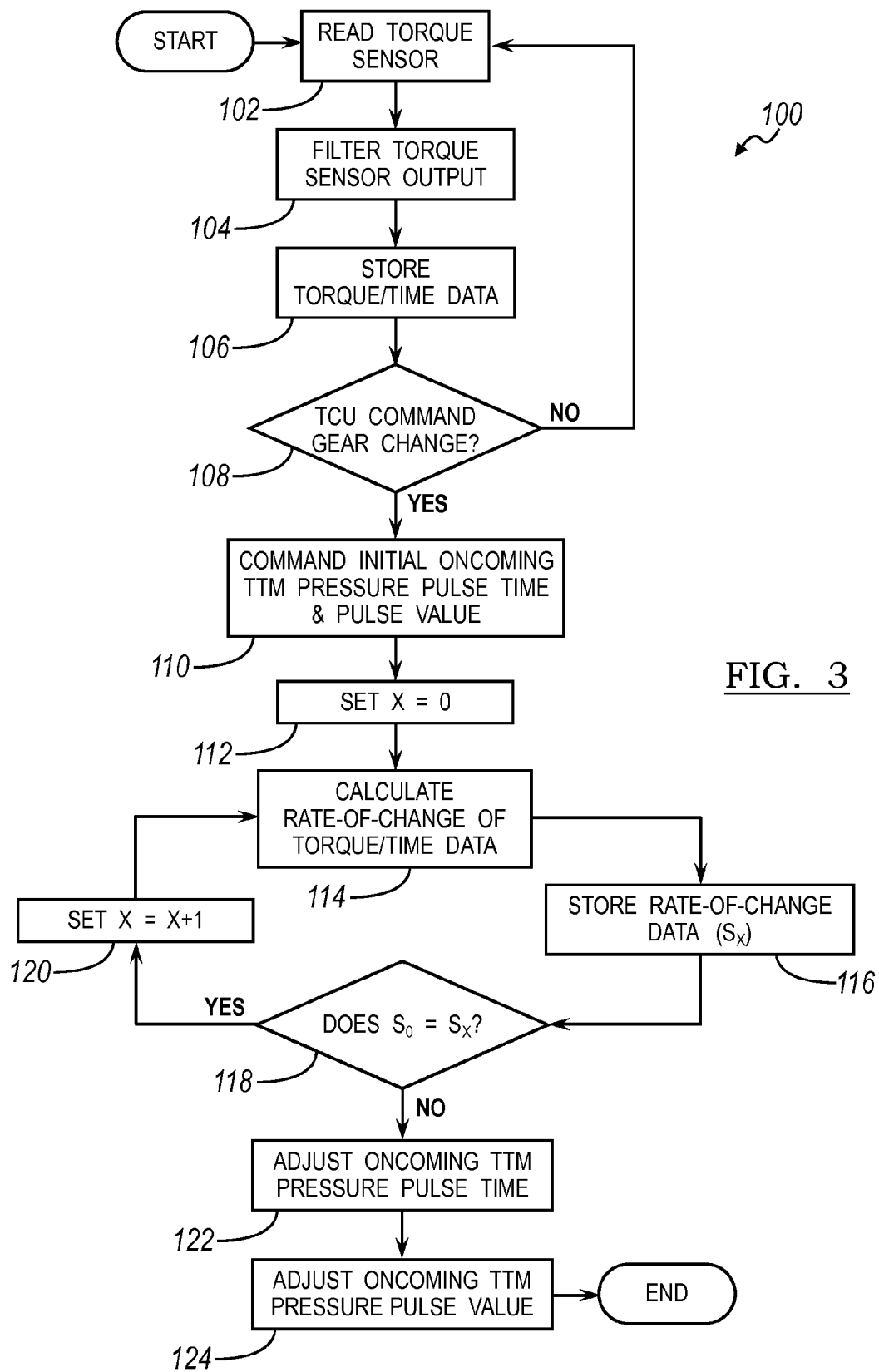
FIG. 3 is a flowchart of a method for controlling a torque-transmitting mechanism according to the present invention.

Referring now to FIG. 3, a flowchart of a method 100 for controlling the engagement of the torque-transmitting mechanisms 26A-C, in accordance with an embodiment of the present invention will now be described. In general, there are five phases when engaging an oncoming clutch: Fill, Transition, Closed Loop, Near Synchronization and Completion. The method 100 depicted in FIG. 3 determines when the Fill phase is terminated and when the Transition phase begins. The steps of the method 100 correspond to the control logic described above employed by the transmission controller 33. The method begins at block 102 where the torque sensor 30 reads and sends torque data to the transmission controller 33. In the next block 104, the transmission controller 33 filters the raw torque signal thus creating a refined torque signal with reduced noise. The filter, for example, is a first order lag filter type. In block 106 the transmission controller 33 stores an initial torque data sampled from the refined torque signal in a memory storage device (not shown) in the transmission controller 33. In block 108, the transmission controller 33 determines whether a gear change has been commanded. Whether a gear change is commanded is determined by a separate control logic containing a gear shift schedule. If a gear change is not commanded, the method 100 returns to block 102. If a gear change has been commanded, the method proceeds to block 110. In block 110, once the required gear ratio is identified, the transmission controller 33 selects which of the torque-transmitting mechanisms 26A-C requires disengagement (i.e., which is the off-going torque-transmitting mechanism) and which of the torque-transmitting mechanisms 26A-C requires engagement (i.e., which is the oncoming torque-transmitting mechanism). Then the transmission controller 33 commands an initial pressure pulse time and pressure pulse value for the oncoming torque-transmitting mechanism 26A-C. The initial pressure pulse time is a signal corresponding to the amount time for a pulse of hydraulic fluid to be communicated to a shift actuator and the pressure pulse value is a signal corresponding to the amount of pressure of the hydraulic fluid communicated to the shift actuator. In block 112, a numerical counter variable, represented by reference character "X" in the example provided, is set to "0".

The method 100 then enters a loop beginning with block 114 as the transmission controller 33 calculates a rate-of-change of the torque data stored in the memory storage device of the transmission controller 33. In the method 100 the variable $S_X$ is used to store a value for the rate-of-change of the torque data as calculated by the transmission controller 33. In block 116, the rate-of-change value calculated in block 114 is stored and associated with the numerical counter variable, represented by the reference character "$S_X$" in the example provided. For example, the first execution of block 116 results in a current rate-of-change $S_X$ also being an initial rate-of-change value stored as $S_0$. In block 118 the initial rate-of-change value $S_0$ is compared with the current rate-of-change value $S_X$. If the initial rate-of-change value is equal to the current rate-of-change value, then the method 100 proceeds to step 120. Again, the first execution of the block 118 results in the comparison of the initial rate-of-change $S_0$ with the initial rate-of change $S_0$ which will always be equal. In block 120, the rate-of-change variable counter X is advanced to 1 (and in subsequent loops X+1) and is followed by block 114 which again calculates the current rate-of-change $S_X$ of the torque data. Block 116 is repeated to store the current rate-of-change $S_1$. In block 118, the current rate-of-change is compared again to the initial rate of change $S_0$. If there is a change in the rate-of-change between the initial calculation and the current calculation, the method 100 continues to blocks 122 and 124 where the transmission controller adjusts the oncoming torque-transmitting mechanism pressure pulse time and pressure pulse value. The difference between the initial rate-of-change $S_0$ and the current rate-of-change $S_X$ is indicative of a change in output torque resulting from a piston of the oncoming torque-transmitting mechanism contacting and applying force to a first plate of a clutch plate pack. It is a this point where it is most advantageous to make an adjustment to the pressure pulse time and pressure pulse value to achieve a quicker and more efficient engagement of the oncoming torque transmitting mechanism.

The description of the invention is merely exemplary in nature and variations that do not depart from the gist of the invention are intended to be within the scope of the invention. Such variations are not to be regarded as a departure from the spirit and scope of the invention.

What is claimed is:

1. An automatic transmission having:
    a transmission housing;
    an input member and an output member;
    a plurality of torque-transmitting mechanisms operable to provide a plurality of gear ratios between the input member and the output member;
    a torque sensor disposed in the transmission housing proximate the output member; and
    a transmission control module having a control logic sequence, wherein the control logic operates to control engagement of each of the torque-transmitting mechanisms, and wherein the torque sensor is capable of detecting a torque applied to the output member and sending a torque signal to the transmission control module, the control logic sequence including:
        a first control logic for generating a torque signal indicative of the torque applied to the output member;
        a second control logic for filtering the torque signal;
        a third control logic for generating and storing an initial torque signal data set from the filtered torque signal;
        a fourth control logic for receiving a gear change command;
        a fifth control logic for commanding a hydraulic fluid pressure pulse time and pressure pulse value to engage a first torque-transmitting mechanism;
        a sixth control logic for disengaging a second torque-transmitting mechanism;
        a seventh control logic for calculating an initial rate-of-change of the stored torque signal data set;
        a eighth control logic for storing the initial rate-of-change;
        a ninth control logic for generating and storing a second torque signal data set from the filtered torque signal;
        a tenth control logic for calculating a second rate-of-change of the second torque signal data set; and
        an eleventh control logic for adjusting the hydraulic fluid pressure pulse time and pressure pulse value if the second rate-of-change is not equal to the initial rate-of-change and performing the ninth control logic if the second rate-of-change is equal to the initial rate-of-change.

2. The automatic transmission of claim 1 further including a hydraulic control system in communication with the transmission control module.

3. The automatic transmission of claim 2 wherein the hydraulic control system receives a command signal from the transmission control module and generates a hydraulic signal.

4. The automatic transmission of claim 3 wherein the hydraulic control system communicates the hydraulic signal to one of the plurality of torque transmitting mechanisms.

5. The automatic transmission of claim 4 wherein the command signal includes the hydraulic fluid pressure pulse and pressure pulse value.

6. A method of controlling a torque-transmitting mechanism of an automatic transmission using a transmission controller, the transmission including a housing, a plurality of torque-transmitting mechanisms, a plurality of gears, a hydraulic control system, and a torque sensor, wherein the torque sensor is located on the housing of the automatic transmission, the method comprising:
- a first step of generating a torque signal from the torque sensor indicative of the torque applied to the shaft;
- a second step of filtering the torque signal using the transmission controller;
- a third step of generating and storing an initial torque signal data set from the filtered torque signal using the transmission controller;
- a fourth step of the transmission controller receiving a gear change command;
- a fifth step of the transmission controller commanding to the hydraulic control system a hydraulic fluid pressure pulse time and a pressure pulse value to engage a first torque-transmitting mechanism;
- a sixth step of the transmission controller commanding the hydraulic control system to disengage a second torque-transmitting mechanism;
- a seventh step of the transmission controller calculating an initial rate-of-change of the stored torque signal data set;
- an eighth step of the transmission controller storing the initial rate-of-change;
- a ninth step of the transmission controller calculating a second rate-of-change of the stored torque signal data set;
- a tenth step of the transmission controller storing the second rate-of-change;
- an eleventh step of the transmission controller instructing the hydraulic controller to adjust the hydraulic fluid pressure pulse time and a pressure pulse value if the second rate-of-change is not equal to the initial rate-of-change and returning to the ninth step if the second rate-of-change is equal to the initial rate-of-change.

7. An automatic transmission having:
- a transmission housing;
- an input member and an output member;
- a plurality of gears disposed in the transmission housing;
- a hydraulic control system;
- a plurality of torque-transmitting mechanisms operable to selectively interconnect at least one of a first, second and third member of a first planetary gear set with at least one of a first, second and third member of a second planetary gear set, the input member and the output member;
- a torque sensor disposed in the transmission housing proximate the output member; and
- a transmission control module having a control logic sequence, wherein the transmission control module is in communication with the hydraulic control system, wherein the torque sensor is capable of detecting a torque applied to the output member and sending a torque signal to the transmission control module, and wherein the control logic operates to control engagement of each of the torque-transmitting mechanisms, the control logic including:
  - a first control logic for generating a torque signal indicative of the torque applied to the output member;
  - a second control logic for filtering the torque signal;
  - a third control logic for generating and storing an initial torque signal data set from the filtered torque signal;
  - a fourth control logic for receiving a gear change command;
  - a fifth control logic for commanding a hydraulic fluid pressure pulse time and a pressure pulse value to engage a first torque-transmitting mechanism;
  - a sixth control logic for disengaging a second torque-transmitting mechanism;
  - a seventh control logic for calculating an initial rate-of-change of the stored torque signal data set;
  - a eighth control logic for storing the initial rate-of-change;
  - a ninth control logic for generating and storing a second torque signal data set from the filtered torque signal;
  - a tenth control logic for calculating a second rate-of-change of the second torque signal data set; and
  - an eleventh control logic for adjusting the hydraulic fluid pressure pulse time and pressure pulse value if the second rate-of-change is not equal to the initial rate-of-change and performing the ninth control logic if the second rate-of-change is equal to the initial rate-of-change.

8. The automatic transmission of claim 7 further wherein the plurality of gears is in the form of a plurality of planetary gear sets.

9. The automatic transmission of claim 8 wherein the hydraulic fluid control system receives a command signal from the transmission control module and generates a hydraulic signal.

10. The automatic transmission of claim 9 wherein the hydraulic control system communicates the hydraulic signal to one of the plurality of torque transmitting mechanisms.

11. The automatic transmission of claim 10 wherein the command signal includes the hydraulic fluid pressure pulse and pressure pulse value.

* * * * *